(12) United States Patent
Park et al.

(10) Patent No.: US 10,424,788 B2
(45) Date of Patent: Sep. 24, 2019

(54) NEGATIVE ELECTRODE FOR SECONDARY BATTERY, ELECTRODE ASSEMBLY COMPRISING SAME, AND SECONDARY BATTERY

(71) Applicant: LG Chem, Ltd., Seoul (KR)

(72) Inventors: Su Jin Park, Daejeon (KR); Byung Hun Oh, Daejeon (KR); Eun Kyung Kim, Daejeon (KR); Sun Young Shin, Daejeon (KR); Hyun Wook Kim, Daejeon (KR)

(73) Assignee: LG Chem, Ltd. (KR)

( * ) Notice: Subject to any disclaimer, the term of this patent is extended or adjusted under 35 U.S.C. 154(b) by 113 days.

(21) Appl. No.: 15/520,000

(22) PCT Filed: Oct. 12, 2015

(86) PCT No.: PCT/KR2015/010720
§ 371 (c)(1),
(2) Date: Apr. 18, 2017

(87) PCT Pub. No.: WO2016/068516
PCT Pub. Date: May 6, 2015

(65) Prior Publication Data
US 2018/0301702 A1    Oct. 18, 2018

(30) Foreign Application Priority Data

Oct. 31, 2014  (KR) .................. 10-2014-0150439

(51) Int. Cl.
*H01M 4/583*    (2010.01)
*H01M 4/133*    (2010.01)
(Continued)

(52) U.S. Cl.
CPC ............. *H01M 4/583* (2013.01); *H01M 2/14* (2013.01); *H01M 4/0404* (2013.01);
(Continued)

(58) Field of Classification Search
CPC ...... H01M 4/366; H01M 4/587; H01M 10/05; H01M 4/622; H01M 4/625; H01M 4/62;
(Continued)

(56) References Cited

U.S. PATENT DOCUMENTS

2009/0305139 A1    12/2009  Oh et al.
2010/0273058 A1*   10/2010  Lee .................... H01M 4/133
                                                              429/225

(Continued)

FOREIGN PATENT DOCUMENTS

JP    2012033375 A    2/2012
JP    2014165079 A    9/2014
(Continued)

OTHER PUBLICATIONS

International Search Report from PCT/KR2015/010720, dated Feb. 15, 2016.

*Primary Examiner* — Jonathan G Jelsma
*Assistant Examiner* — Omar M Kekia
(74) *Attorney, Agent, or Firm* — Lerner, David, Littenberg, Krumholz & Mentlik, LLP

(57) ABSTRACT

The present invention relates to a negative electrode for a secondary battery, an electrode assembly comprising same, and a secondary battery comprising the electrode assembly, the negative electrode comprising: a current collector; and a negative electrode active material layer on one or more sides of the current collector, wherein the negative electrode active material layer comprises an amphiphilic polymer and a negative electrode active material having graphite on which an amorphous carbon coating layer is formed.

10 Claims, 1 Drawing Sheet

(51) Int. Cl.
- *H01M 4/587* (2010.01)
- *H01M 4/62* (2006.01)
- *H01M 2/14* (2006.01)
- *H01M 4/04* (2006.01)
- *H01M 4/66* (2006.01)
- *H01M 10/052* (2010.01)
- *H01M 4/36* (2006.01)
- *H01M 4/02* (2006.01)

(52) U.S. Cl.
CPC ........... *H01M 4/133* (2013.01); *H01M 4/366* (2013.01); *H01M 4/587* (2013.01); *H01M 4/62* (2013.01); *H01M 4/622* (2013.01); *H01M 4/625* (2013.01); *H01M 4/661* (2013.01); *H01M 10/052* (2013.01); *H01M 2004/027* (2013.01); *H01M 2004/028* (2013.01)

(58) Field of Classification Search
CPC ........... H01M 4/133; H01M 2004/028; H01M 4/661; H01M 4/583; H01M 4/0404; H01M 2/14; H01M 2004/027; H01M 10/052

USPC .............................................. 429/231.8, 209
See application file for complete search history.

(56) References Cited

U.S. PATENT DOCUMENTS

| | | | | |
|---|---|---|---|---|
| 2014/0050980 | A1* | 2/2014 | Kang | ..................... H01M 4/133 |
| | | | | 429/211 |
| 2014/0065488 | A1* | 3/2014 | Lee | ......................... C01B 31/04 |
| | | | | 429/231.8 |
| 2014/0170454 | A1 | 6/2014 | Kwon et al. | |
| 2014/0227588 | A1 | 8/2014 | Kim et al. | |
| 2015/0340696 | A1 | 11/2015 | Son et al. | |

FOREIGN PATENT DOCUMENTS

| | | |
|---|---|---|
| KR | 20080021270 A | 3/2008 |
| KR | 20130045221 A | 5/2013 |
| KR | 20140090109 A | 7/2014 |
| KR | 20140099987 A | 8/2014 |

\* cited by examiner

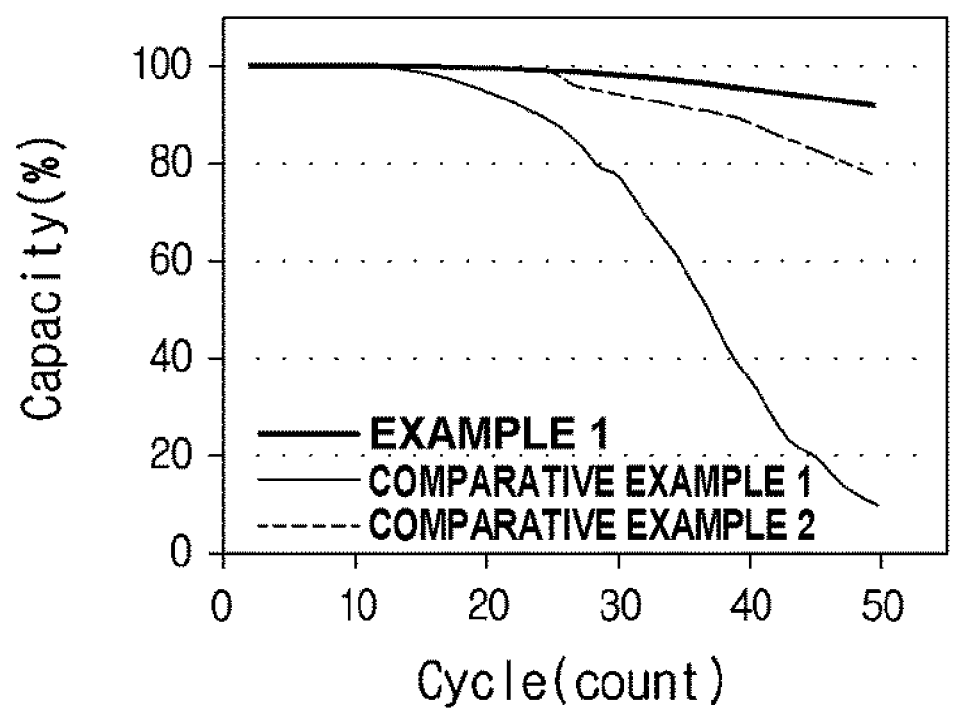

NEGATIVE ELECTRODE FOR SECONDARY BATTERY, ELECTRODE ASSEMBLY COMPRISING SAME, AND SECONDARY BATTERY

CROSS-REFERENCE TO RELATED APPLICATIONS

The present application is a national phase entry under 35 U.S.C. § 371 of International Application No. PCT/KR2015/010720 filed Oct. 12, 2015, which claims the benefit of Korean Patent Application No. 10-2014-0150439 filed on Oct. 31, 2014, the disclosures of which are hereby incorporated by reference in their entirety into this application.

FIELD OF THE INVENTION

The present disclosure relates to a negative electrode for a secondary battery, an electrode assembly comprising same, and a secondary battery.

DESCRIPTION OF THE RELATED ART

Unlike primary batteries that are impossible to charge, secondary batteries capable of charging and discharging have been actively studied to be used in high technology fields such as digital cameras, mobile phones, laptops and hybrid vehicles.

Such secondary batteries are divided into nickel-cadmium batteries, nickel-metal hydride batteries, nickel-hydrogen batteries, lithium secondary batteries and the like. Among these, lithium secondary batteries have higher operating voltages compared to nickel-cadmium batteries or nickel-metal hydride batteries, and have excellent energy density properties per unit weight, and therefore, have been mostly used in portable electronic devices or high-output hybrid vehicles.

Meanwhile, a lithium secondary battery generally includes a constitution such as an electrode assembly provided with a positive electrode, a negative electrode and a separator, electrode tabs extended from the electrode assembly, and electrode leads welded to the electrode tabs.

Herein, the negative electrode is generally formed by coating a carbon-based negative electrode active material on a current collector. Herein, as the negative electrode active material, crystalline carbon such as natural graphite or artificial graphite, etc. having high theoretical marginal capacity has been used.

However, the natural graphite, the artificial graphite or the like has strong moisture absorptivity and thereby increases viscosity of negative electrode active material slurry in the course of time, and the manufacturing of electrodes using the same has a problem of significantly reducing processibility since constant loading control is difficult.

DISCLOSURE OF THE INVENTION

Technical Problem

The present disclosure has been made in view of the above, and is directed to providing a negative electrode for a secondary battery prepared using a negative electrode active material layer including a negative electrode active material that includes amorphous carbon coating layer-formed graphite, and an amphiphilic polymer, and an electrode assembly comprising same and a secondary battery.

Technical Solution

In one aspect, the present disclosure provides a negative electrode for a secondary battery including a current collector; and a negative electrode active material layer on at least one surface of the current collector, wherein the negative electrode active material layer includes a negative electrode active material including amorphous carbon coating layer-formed graphite, and an amphiphilic polymer.

In another aspect, the present disclosure provides an electrode assembly in which a positive electrode and a negative electrode are alternately laminated with a separator as a boundary, wherein the negative electrode is the negative electrode for a secondary battery according to the present disclosure.

In still another aspect, the present disclosure provides a secondary battery including the electrode assembly.

Advantageous Effects

The present disclosure is capable of significantly enhancing processibility of the preparation of a negative electrode for a secondary battery by using a negative electrode active material layer including an amphiphilic polymer and a negative electrode active material that includes amorphous carbon coating layer-formed graphite.

In addition, a secondary battery including the negative electrode prepared as above has enhanced battery capacity and has very advantageous effects.

DESCRIPTION OF DRAWINGS

FIG. 1 is a graph showing cycle life properties of batteries manufactured in Example 1 and Comparative Examples 1 and 2 of the present disclosure.

MODE FOR CARRYING OUT THE INVENTION

Hereinafter, preferred embodiments of the present disclosure will be described. However, embodiments of the present disclosure may be modified to various other forms, and the scope of the present disclosure is not limited to the embodiments described below. In addition, embodiments of the present disclosure are provided for more completely describing the present disclosure to those having average knowledge in the art.

As a result of repeated studies conducted for enhancing processibility when preparing slurry of a negative electrode active material using artificial graphite, the inventors of the present disclosure have found out that such a goal is capable of being accomplished when using amorphous carbon coating layer-formed graphite as a negative electrode active material, and mixing an amphiphilic polymer thereto, and have completed the present disclosure.

More specifically, a negative electrode for a secondary battery of the present disclosure includes a current collector; and a negative electrode active material layer on at least one surface of the current collector, wherein the negative electrode active material layer includes a negative electrode active material including amorphous carbon coating layer-formed graphite, and an amphiphilic polymer.

Herein, the current collector means a negative electrode current collector, and those well known in the art may be used without limit, and for example, copper, nickel or the like may be used.

Next, a negative electrode active material layer may be formed on at least one surface of the current collector using negative electrode active material slurry. Herein, the negative electrode active material layer may be formed using methods well known in the art, and for example, may be formed through a method of coating, rolling and drying the negative electrode active material slurry according to the present disclosure on at least one surface of the current collector.

In the present disclosure, the negative electrode active material slurry includes a negative electrode active material including amorphous carbon coating layer-formed graphite, and an amphiphilic polymer.

Herein, amorphous carbon or crystalline carbon is generally used as a material of the negative electrode active material, and among these, crystalline carbon is mostly used due to its high capacity. As such crystalline carbon, artificial graphite with high charge and discharge efficiency is mostly used.

However, the artificial graphite has very low dispersibility in aqueous slurry causing difficulties in terms of processibility, and as a result, capacity of a manufactured battery is low, which leads to a problem in that a target level of physical property characteristics of the battery is difficult to obtain.

Accordingly, in order to solve such disadvantages of artificial graphite, the inventors of the present disclosure significantly enhance slurry dispersibility by forming an amorphous carbon coating layer on the artificial graphite, and preparing negative electrode active material slurry through mixing the result with an amphiphilic polymer.

More specifically, the amphiphilic polymer is a polymer having both a hydrophobic group and a hydrophilic group, and including of the amphiphilic polymer is very effective in preventing a decline in the dispersibility of aqueous slurry. More specifically, the amphiphilic polymer may be, for example, any one selected from the group consisting of polyvinyl pyrrolidone, polystyrene, diethylene glycol and combinations thereof, but is not limited thereto.

Herein, the content of the amphiphilic polymer may be from 0.001 parts by weight to 10 parts by weight and preferably from 0.01 parts by weight to 10 parts by weight based on 100 parts by weight of the negative electrode active material. When the content of the amphiphilic polymer satisfies the above-mentioned numerical range, the effect of enhancing dispersibility of the negative electrode active material is very significant in the negative electrode active material slurry improved by adding the amphiphilic polymer.

Particularly, the amphiphilic polymer is preferably polyvinyl pyrrolidone in the present disclosure. The polyvinyl pyrrolidone is one type of a water-soluble polymer and is an amphiphilic material having both a hydrophobic methylene group and a hydrophilic amide group.

Meanwhile, when polyvinyl pyrrolidone, an amphiphilic material, is added to the amorphous carbon coating layer-formed artificial graphite as described above in the preparation of the negative electrode active material slurry, the polyvinyl pyrrolidone is adsorbed on the surface of the coating layer-formed artificial graphite, thereby significantly reducing changes occurring with the passage of time caused by a phase change and the like of the slurry after a mixing process for preparing the negative electrode active material slurry while enhancing dispersibility of the artificial graphite in the negative electrode active material slurry.

Herein, such an amorphous carbon coating layer may be formed through coating by a liquid or solid pitch, however, the method is not limited thereto. More specifically, the coating may be carried out by, for example, placing the pitch and the artificial graphite in a furnace, and baking the result in a temperature range of 300° C. to 1400° C. Herein, the pitch may be a coal-based pitch or a petroleum-based pitch, but is not limited thereto.

Meanwhile, the amount of the amorphous carbon with respect to the graphite may be from 0.01 parts by weight to 15 parts by weight based on 100 parts by weight of the graphite. When the coating amount of the amorphous carbon is less than 0.01 parts by weight, hardness of the carbon decreases, and a side reaction with a liquid electrolyte may increase. When the coating amount of the amorphous carbon is greater than 15 parts by weight, the amorphous carbon coating layer becomes too thick, which may become an obstacle for lithium ion mobility leading to an increase in the resistance, and the surface becomes hard unable to increase electrode density.

Meanwhile, although not absolutely required, the negative electrode active material slurry may further include a conductor for enhancing conductivity, and may further include a filler for suppressing negative electrode expansion.

Herein, the conductor is not particularly limited as long as it has conductivity without causing chemical changes in a formed battery. Examples thereof may include carbon black such as denka black, acetylene black, ketjen black, furnace black and thermal black; natural graphite, artificial graphite and the like. Particularly, carbon black, graphite powder and carbon fiber are preferred.

In addition, the filler is not particularly limited as long as it is a filler material that does not induce chemical changes in a formed battery, and examples thereof may include any one olefin-based polymer selected from the group consisting of polyethylene, polypropylene and combinations thereof; or any one fibrous material selected from the group consisting of glass fiber, carbon fiber and combinations thereof.

Next, an electrode assembly according to the present disclosure is an electrode assembly in which a positive electrode and a negative electrode are alternately laminated with a separator as a boundary, wherein the negative electrode is the negative electrode for a secondary battery according to the present disclosure.

Herein, the positive electrode may be prepared using methods well known in the art, and for example, may be prepared using a method of coating a positive electrode active material on a positive electrode current collector, and then drying the result. As the positive electrode current collector, aluminum and the like may be used, and as the positive electrode active material, a lithium-containing transition metal oxide may be used, however, the positive electrode current collector and the positive electrode active material are not limited thereto.

Next, the separator is provided between the positive electrode and the negative electrode and performs a role of insulating between the positive electrode and the negative electrode. As the separator, insulating thin films having high ion permeability and mechanical strength are generally used. Herein, the separator may have, for example, a pore diameter of 0.01 μm to 10 μm and a thickness of 5 μm to 310 μm.

In addition, separators generally used in the art may be used without limit as the separator, and examples thereof may include chemical resistant and hydrophobic olefin-based polymer glass fiber such as polypropylene, or sheets, non-woven fabrics, kraft papers or the like made of polyethylene or the like. More specifically, any one selected from the group consisting of high-density polyethylene, low-density polyethylene, linear low-density polyethylene, ultra-high-molecular-weight polyethylene, polypropylene, polyethylene terephthalate, polybutylene terephthalate, polyester, polyacetal, polyamide, polycarbonate, polyimide, polyetheretherketone, polyethersulfone, polyphenylene oxide, polyphenylenesulfidro, polyethylene naphthalene and mixtures thereof may be used, however, the separator is not limited thereto.

Meanwhile, in the present disclosure, the electrode assembly is an electrode assembly in which at least one of the positive electrodes and at least one of the negative electrodes are alternately laminated with the separator as a boundary, and may be formed in a stack-type or a stack/folding-type structure, but is not particularly limited thereto.

A secondary battery according to the present disclosure includes the electrode assembly.

EXEMPLARY EMBODIMENT OF THE INVENTION

Hereinafter, specific examples will be examined.

Example: Manufacture of Secondary Battery

Example 1

Negative electrode active material slurry was prepared by using pitch-coated artificial graphite as a negative electrode active material and adding PVP, SBR and CMC in ratios of the following Table 1.

Next, the negative electrode active material slurry was coated on one surface of a copper current collector to a thickness of 65 μm, and the result was dried, rolled and punched to a necessary size to prepare a negative electrode.

Meanwhile, ethylene carbonate (EC) and diethyl carbonate (DEC) were mixed in a volume ratio of 30:70, and $LiPF_6$ was added to the mixed solvent to prepare a 1M non-aqueous $LiPF_6$ liquid electrolyte.

As a counter electrode, that is, a positive electrode, lithium metal foil was used, and after providing a polyolefin separator between the prepared negative electrode and the prepared positive electrode, the prepared non-aqueous liquid electrolyte was injected thereto to manufacture a coin-type lithium secondary battery.

Comparative Example 1

A battery was manufactured in the same manner as in Example 1 except that the negative electrode active material slurry was prepared in the ratios of the following Table 1.

Comparative Example 2

A battery was manufactured in the same manner as in Example 1 except that artificial graphite on which the pitch was not coated was used.

TABLE 1

| Category | Example 1 | Comparative Example 1 | Comparative Example 2 |
|---|---|---|---|
| Active Material (% by weight) | 97 | 98 | 97 |
| PVP (% by weight) | 1 | 0 | 1 |
| SBR (% by weight) | 1 | 1 | 1 |
| CMC (% by weight) | 1 | 1 | 1 |
| Total | 100 | 100 | 100 |

Test Example: Measurement on Secondary Battery Cycle Life Property

The batteries manufactured in Example 1 and Comparative Examples 1 and 2 were charged to 4.25V under a constant current (CC) of 0.1 C with battery capacity of 1.1 mAh, and then charged under a constant voltage (CV) of 4.25V until a charging current became 0.005 mA. After that, the batteries were left unattended for 10 minutes, and discharged under a condition of 0.1 C until reaching 3.0V. After the initial charge and discharge, a cycle life property test was carried out at room temperature under a current corresponding to 0.5 C. The results are shown in FIG. 1.

When referring to FIG. 1, the battery to which polyvinyl pyrrolidone (PVP) was added (Example 1) exhibited cycle life retention rate of approximately 90% even after 50 times of charge and discharge, but the battery to which polyvinyl pyrrolidone was not added (Comparative Example 1) exhibited rapid cycle life degradation after $20^{th}$ charge and discharge. In addition, when using artificial graphite having a pitch coated thereon together with the polyvinyl pyrrolidone (Example 1), it was identified that an effect of preventing cycle life degradation after $20^{th}$ charge and discharge was enhanced compared to a case of using artificial graphite on which a pitch was not coated (Comparative Example 2). From such results, it was identified that battery capacity of the lithium secondary battery including the negative electrode active material according to the Example 1 of the present disclosure was significantly enhanced compared to Comparative Examples 1 and 2.

Hereinbefore, examples of the present disclosure have been described in detail, however, the scope of a right of the present disclosure is not limited thereto, and it will be obvious to those skilled in the art that various modifications and changes may be made within the scope that does not depart from technological ideas of the present disclosure described in the claims.

The present disclosure relates to a negative electrode for a secondary battery, and an electrode assembly and a secondary battery including the same, and the negative electrode for a secondary battery includes a current collector; and negative electrode active material slurry on at least one surface of the current collector, wherein the negative electrode active material slurry includes a negative electrode active material including amorphous carbon coating layer-formed graphite, and an amphiphilic polymer.

The negative electrode for a secondary battery is capable of significantly enhancing processibility of the preparation of the negative electrode for a secondary battery by using a negative electrode active material slurry including a negative electrode active material that includes amorphous carbon coating layer-formed graphite, and an amphiphilic polymer, and in addition, a secondary battery including the negative electrode prepared as above has enhanced battery capacity and has very advantageous effects.

What is claimed is:

1. A negative electrode for a secondary battery comprising:
    a current collector; and
    a negative electrode active material layer on at least one surface of the current collector,
    wherein the negative electrode active material layer comprises a negative electrode active material consisting essentially of an amorphous carbon coating layer formed on artificial graphite, and an amphiphilic polymer, and wherein the amphiphilic polymer is polyvinyl pyrrolidone.

2. The negative electrode for a secondary battery of claim 1, wherein a content of the amphiphilic polymer is from 0.001 parts by weight to 10 parts by weight based on 100 parts by weight of the negative electrode active material.

3. The negative electrode for a secondary battery of claim 1, wherein the amorphous carbon coating layer comprises a liquid or solid pitch.

4. The negative electrode for a secondary battery of claim 1, wherein an amount of the amorphous carbon with respect to the artificial graphite is from 0.01 parts by weight to 15 parts by weight based on 100 parts by weight of the artificial graphite.

5. The negative electrode for a secondary battery of claim 1, wherein the negative electrode active material layer further comprises a conductor.

6. The negative electrode for a secondary battery of claim 5, wherein the conductor is any one selected from denka black, acetylene black, ketjen black, furnace black, thermal black, natural graphite or artificial graphite.

7. The negative electrode for a secondary battery of claim 1, wherein the negative electrode active material layer further comprises a filler.

8. The negative electrode for a secondary battery of claim 7, wherein the filler is any one olefin-based polymer selected from polyethylene, polypropylene or combinations thereof; or any one fibrous material selected from glass fiber, carbon fiber or combinations thereof.

9. An electrode assembly in which a positive electrode and a negative electrode are alternately laminated with a separator as a boundary, wherein the negative electrode is the negative electrode for a secondary battery of claim 1.

10. A secondary battery comprising the electrode assembly of claim 9.

* * * * *